United States Patent [19]
Gage et al.

[11] Patent Number: 6,160,774
[45] Date of Patent: Dec. 12, 2000

[54] POSITION SENSOR FOR TRACKING SYSTEM FOR OPTICAL DATA STORAGE

[75] Inventors: Edward C. Gage, Apple Valley; Nicholas Jordache, Eden Prairie; Ronald E. Gerber, Richfield, all of Minn.

[73] Assignee: Seagate Technology LLC, Scotts Valley, Calif.

[21] Appl. No.: 09/055,373

[22] Filed: Apr. 6, 1998

Related U.S. Application Data

[60] Provisional application No. 60/059,495, Sep. 22, 1997.

[51] Int. Cl.[7] .................................................. G11B 7/00
[52] U.S. Cl. ............................ 369/44.42; 369/44.23; 369/112
[58] Field of Search ........................ 369/44.23, 44.24, 369/44.42, 54, 112, 120; 250/203.1, 203.2, 206.1, 206.2

[56] References Cited

U.S. PATENT DOCUMENTS

| | | | |
|---|---|---|---|
| 4,425,043 | 1/1984 | Van Rosmalen | 250/206.1 X |
| 5,113,387 | 5/1992 | Goldsmith et al. | 369/112 X |
| 5,216,649 | 6/1993 | Koike et al. | 369/44.23 |
| 5,815,293 | 9/1998 | Komma et al. | 369/112 X |

*Primary Examiner*—Aristotelis M. Psitos
*Attorney, Agent, or Firm*—Westerman, Champlin & Kelly, PA

[57] ABSTRACT

A disc drive for performing data operations relative to a disc includes a head positionable near the disc. The head is optically coupled to a light source by optics that direct a light beam from the light source to the head. The optics include a tracking position sensor that has first and second light detectors and a reflective surface. The first and second light detectors are capable of providing first and second electrical signals indicative of the amount of light incident on the respective light detectors. A third light detector is coupled to the optics and is receptive of light reflected from the disc.

9 Claims, 3 Drawing Sheets

POSITION SENSOR FOR TRACKING SYSTEM FOR OPTICAL DATA STORAGE

REFERENCE TO CO-PENDING APPLICATION

This application claims priority benefits from U.S. provisional patent application 60/059,495 entitled "POSITION SENSOR FOR TRACKING SYSTEM FOR OPTICAL DATA STORAGE" filed on Sep. 22, 1997.

BACKGROUND OF THE INVENTION

The present invention relates to optical systems. In particular, the present invention relates to optical systems in data storage devices.

Optical data storage systems access data by focusing a laser beam or other light source onto a data surface of a medium and analyzing the light reflected from or transmitted through the medium. In general, data is stored in optical storage systems in the form of marks carried on the surface of the medium which are detected using a reflected laser light.

Compact discs, which are widely used to store computer programs, music and video, are one type of optical data storage system. Typically, compact discs are permanently recorded during manufacture by etching the surface of the compact disc. Another type of optical system is a write once read many (WORM) system in which a user may permanently write information onto a blank disc. Other types of systems are erasable, such as phase change and magneto-optic (M-O) systems. Phase change systems detect data by sensing a change in reflectivity. M-O systems read data by measuring the rotation of the incident light polarization due to the magnetic state of the storage medium.

Each of the above systems focuses a beam of light on to one of a plurality of concentric data tracks on the surface of the disc. To position the beam, most systems use a coarse actuator that positions an objective lens over the desired data track. Light is then reflected through a series of mirrors so that it passes through the objective lens and forms a focused spot on the desired data track.

In some systems, a fine control actuator is used in conjunction with the coarse actuator to position the beam. Typically, this fine control actuator manipulates the position of one of the mirrors that passes the light beam to the objective lens. By changing the position of this mirror, it is possible to move the focused spot of light across the disc without moving the objective lens.

In current systems, the coarse and fine control actuators are controlled by reading servo information from the disc using the focused spot of light. This servo information indicates the position of the light on the disc, and based on this information, a servo controller adjusts the coarse and fine actuator to position the spot of light at the desired position.

With increasing track densities, track widths continue to decrease making it more difficult to position the light beam within a track using just servo information stored on the disc. To more accurately position the light beam, a system is needed that provides more information about the position of the light beam.

SUMMARY OF THE INVENTION

A disc drive for performing data operations relative to a disc includes a head positionable near the disc. The head is optically coupled to a light source by optics that direct a light beam from the light source to the head. The optics include a tracking position sensor that has first and second light detectors and a reflective surface. The first and second light detectors are capable of providing first and second electrical signals indicative of the amount of light incident on the respective light detectors. A third light detector is coupled to the optics and is receptive of light reflected from the disc.

DETAILED DESCRIPTION OF THE PREFERRED EMBODIMENTS

Figure 1:
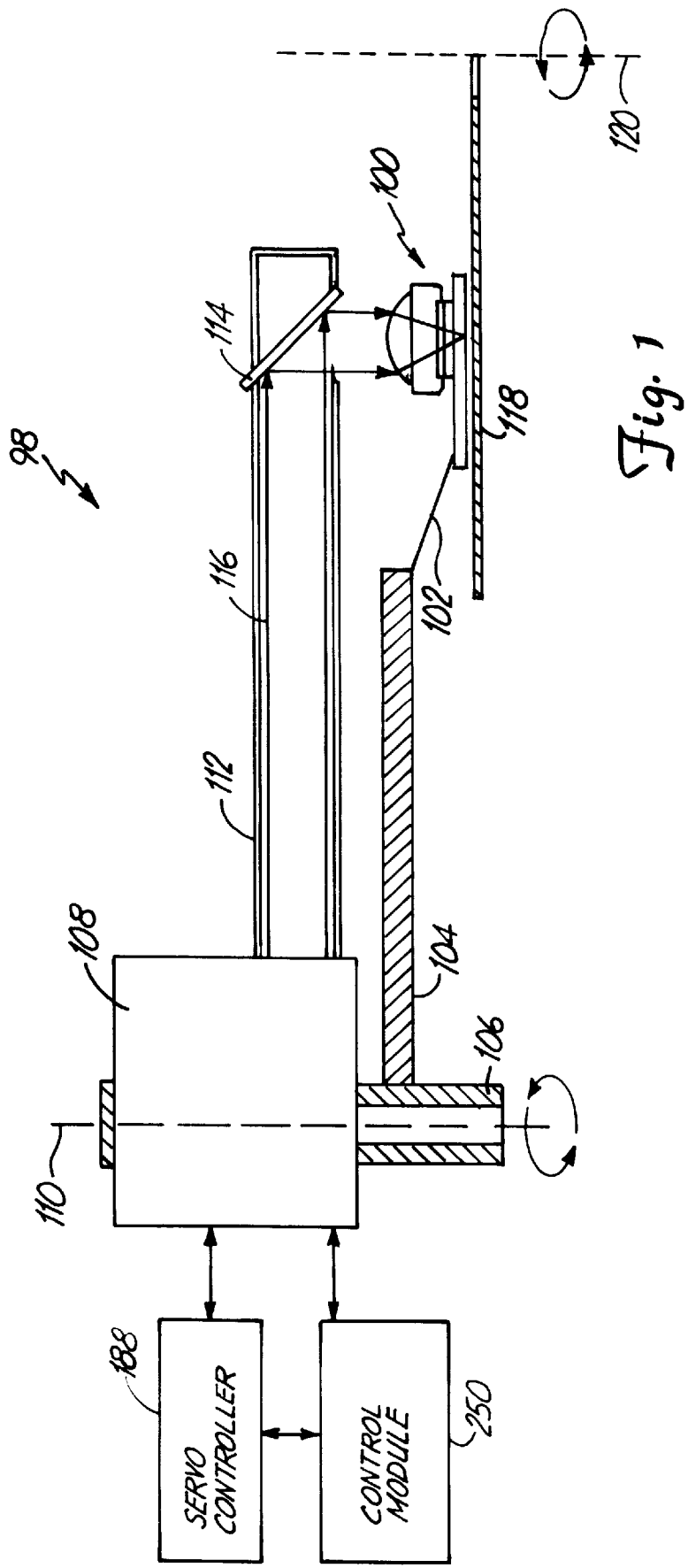
FIG. 1 is a side view of an optical system of the present invention.

FIG. 1 is a side view of an optical storage system 98 of the present invention. An optical module 108, which includes a laser, creates a light beam 116 that is directed through an enclosed optical path 112 extending laterally from optical module 108. Light beam 116 reflects off a tracking position sensor 114 toward an optical head 100, which focuses the collimated beam into a small spot on a disc 118. Disc 118 spins about a central axis 120, continuously bringing new data regions underneath the spot of light produced by optical head 100. The light incident on disc 118 is reflected back through enclosed optical path 112 and is analyzed by a control module 250 and a servo controller 188 attached to optical module 108. Through this process, optical storage system 98 retrieves data and servo information stored on disc 118.

Optical head 100 is supported by a suspension assembly 102 that is supported by an arm 104. Arm 104, optical module 108, and enclosed optical path 112 are all supported by a spindle 106, which rotates about a central axis 110. As spindle 106 rotates, head 100 moves to different radial positions across disc 118 and enclosed optical path 112 rotates to remain aligned with optical head 100. Servo controller 188 rotates spindle 106 by controlling a motor (not shown for clarity) based on servo information read from the disc, servo information generated by tracking position sensor 114, and a desired position received from control module 250. Together, servo controller 188 and spindle 106 form a coarse actuator for positioning the head over the disc.

Figure 2:
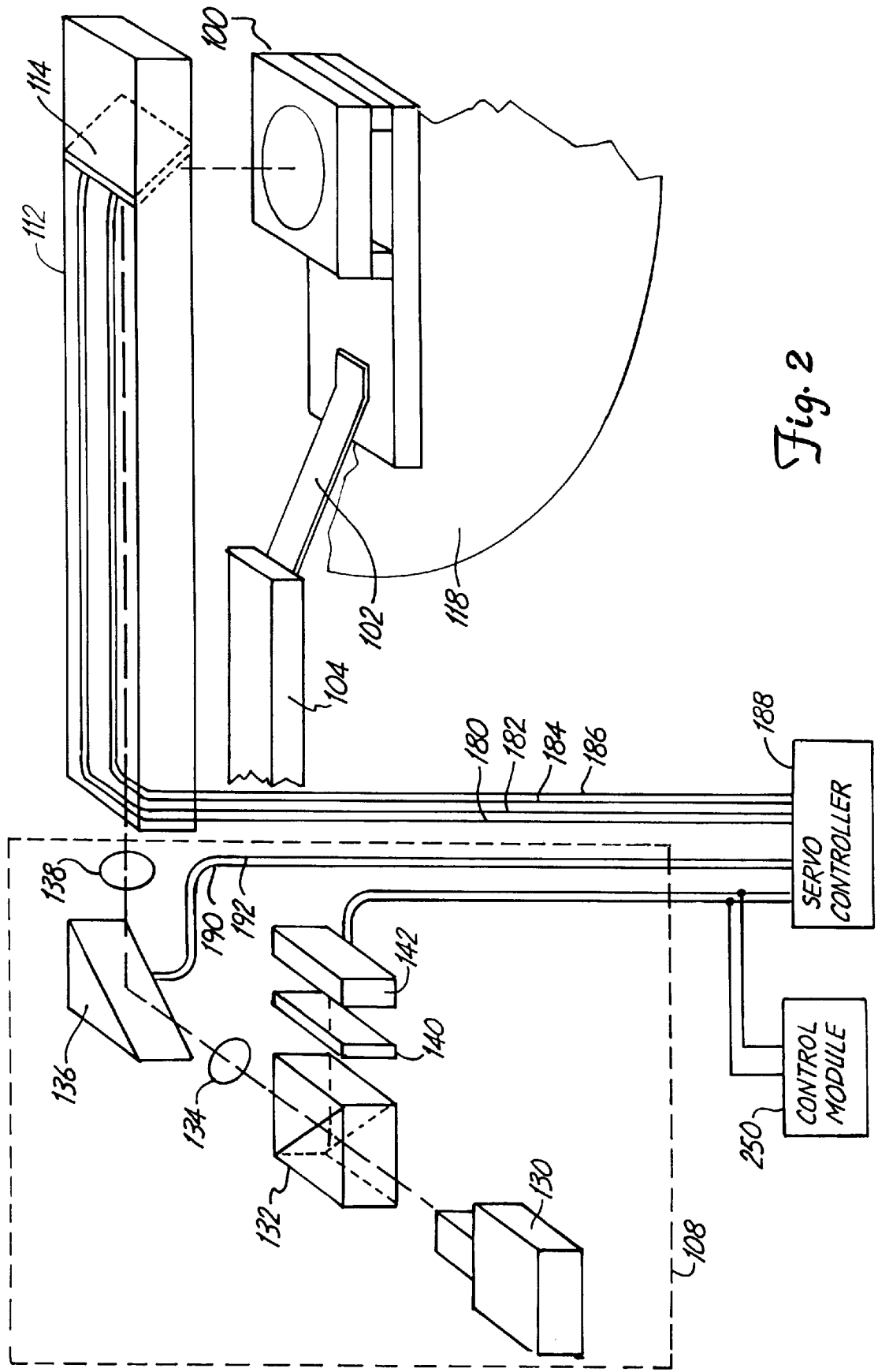
FIG. 2 is a schematic diagram of the optics in the optical system of FIG. 1.

FIG. 2 is a schematic diagram of the optics in optical system 98 of FIG. 1. Within optical module 108, a laser diode 130 generates a light that passes through a beam splitter 132 and a relay lens 134, reflects off a galvo mirror 136, is collimated by an imaging lens 138, reflects off tracking position sensor 114, and is focused onto optical disc 118 by optical head 100. Based on the light incident on tracking position sensor 114, portions of the sensor create electrical signals carried on electrical conductors 180, 182, 184, and 186 to servo controller 188. Servo controller 188 uses the electrical signals to control the rotation of galvo mirror 136 through electrical conductors 190, 192. The rotation of galvo mirror 136 changes the location of the focused light spot on disc 118 and changes the electrical signals produced by tracking position sensor 114. Through galvo mirror 136 it is possible to move the focused spot across several tracks.

Some of the light incident on optical disc 118 reflects off optical disc 118, returns through head 100, reflects off tracking position sensor 114, passes through imaging lens 138, reflects off galvo mirror 136, passes through relay lens 134, is reflected by beam splitter 132, passes through a Wollaston prism 140, and comes to focus either before or after a detector plane 142, which generates an electrical signal on electrical conductors 194 and 196 indicative of the light that is incident on detector plane 142. Conductors 194 and 196 carry the electrical signal to servo controller 188, which uses the electrical signal to control galvo mirror 136 and the position of optical head 100. Conductors 194 and 196 also carry the electrical signal produced by detector plane 142 to control module 250.

Figure 3:
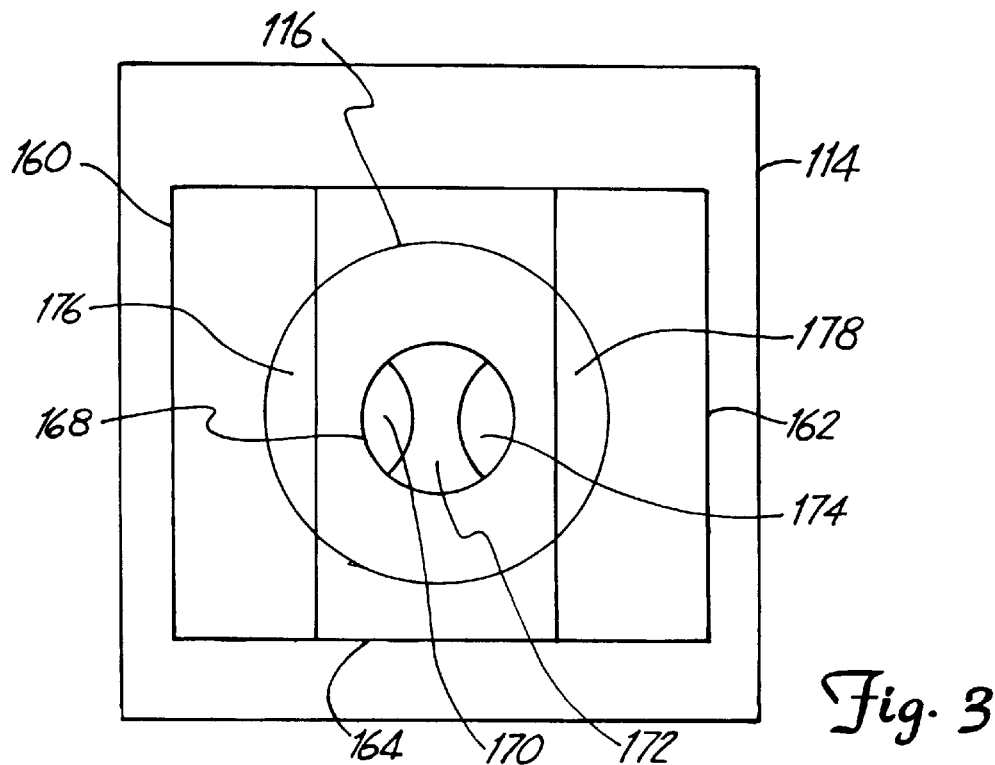
FIG. 3 is a front view of the tracking position sensor of FIG. 2.

FIG. 3 is a front view of tracking position sensor 114 of FIG. 2. Tracking position sensor 114 includes two light detectors 160 and 162 that are separated by a reflective surface 164. The majority of light beam 116 from laser 130 is incident on and reflected by reflective surface 164. Portions 176 and 178 of light beam 116 are incident on light detectors 160 and 162, respectively. Light detectors 160 and 162 absorb the light in portions 176 and 178, respectively, and create electrical signals based on the amount of light they respectively absorb.

Reflective surface 164 reflects the portion of light beam 116 that strikes it. The reflected light is directed toward optical head 100, which focuses the light into a spot on the disc. Optical head 100 does not focus all of the light reflected from reflective surface 164. Instead, only the portion of light found within circle 168 actually reaches the disc. The remaining light is scattered into air or absorb by part of optical head 100. Thus, although light detectors 160 and 162 absorb some of light beam 116, the amount of light reaching the disc is not diminished by this absorption.

A large portion of the light in circle 168 that is incident on disc 118 is reflected back through optical head 100 and on to tracking position sensor 114. The reflected light preferably is enclosed within circle 168. Because of disc topography, some portions of the reflected light are less intense than other portions producing a "baseball" appearance with two dimmer areas 170 and 174 separated by a brighter area 172. Because the reflected light is contained within circle 168, it does not strike light detector 160 or light detector 162.

Figure 4:
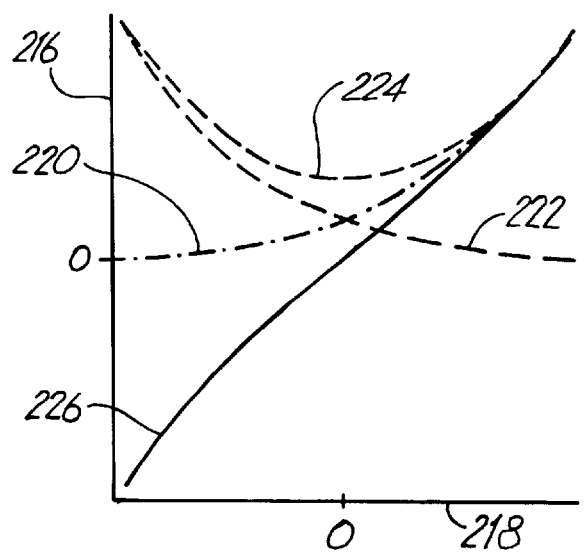
FIG. 4 is a graph of the electrical signals produced by the tracking position sensor of FIG. 2 as a function of galvo mirror rotation.

The electrical signals produced by light detectors 160 and 162 are used to determine the position of beam 116 on tracking position sensor 114 and the rotation of galvo mirror 136. FIG. 4 shows graphs of the electrical signals produced by light detectors 160 and 162, as well as the sum and difference of those two signals, as a function of the rotational angle of galvo mirror 136 for light beam 116 of FIG. 3.

In FIG. 4, the amplitude of the electrical signals are shown along vertical axis 216, and the angle of rotation of galvo mirror 136 is shown in degrees along horizontal axis 218. Graph 220 of FIG. 4 is a graph of the electrical signal produced by light detector 160; graph 222 is a graph of the electrical signal produced by light detector 162; graph 224 is a graph of the sum of the electrical signals produced by light detectors 160 and 162; and graph 226 is a graph of the difference between the electrical signals produced by light detectors 160 and 162.

As shown in FIG. 4, the difference between the two signals produced by the light detectors provides a generally linear graph 226, meaning that the difference between the two signals is generally proportional to the rotational angle of galvo mirror 136. Because of its linearity, the difference between the two light detector signals is preferably used in the servo loop to control the position of galvo mirror 136 or the coarse actuator since it is easy to calculate the rotational angle of the mirror based on the difference between the two signals.

Through the present invention, the position of light beam 116 is controlled better, allowing for more accurate servo control.

Although the present invention has been described with reference to preferred embodiments, workers skilled in the art will recognize that changes may be made in form and detail without departing from the spirit and scope of the invention.

What is claimed is:

1. A disc drive for performing data operations relative to a disc, the disc drive comprising:

a head positionable near the disc;

a light source capable of producing a light beam;

optics, coupled between the head and the light source and capable of directing the light beam from the light source to the head, the optics comprising a tracking position sensor, the tracking position sensor comprising a first light detector, a second light detector, and a reflective surface, the first and second light detectors capable of providing first and second electrical signals, respectively, that are indicative of the amount of light incident on the respective light detectors;

a third light detector, coupled to the optics and receptive of light reflected from the disc, the third light detector capable of providing a third electrical signal; and a mirror capable of being moved based on an electrical signals wherein movement of the mirror chances the position of the light beam on the tracking position sensor.

2. The disc drive of claim 1 wherein the reflective surface reflects at least a portion of the light beam from the light source toward the disc.

3. The disc drive of claim 2 wherein only a portion of the light reflected from the reflective surface is incident on the disc.

4. The disc drive of claim 3 wherein the reflective surface reflects all of the light reflected from the disc.

5. The disc drive of claim 1 wherein the reflective surface is located between the first light detector and the second light detector.

6. The disc drive of claim 1 wherein the first light detector and the second light detector are positioned such that cross-track movement of the light beam incident on the disc caused by movement of the mirror is associated with a change in the amount of light incident on the first light detector relative to the amount of light incident on the second light detector.

7. The disc drive of claim 1 wherein the relative magnitudes of the first electrical signal and the second electrical signal indicate the position of the light beam on the tracking position sensor.

8. A tracking position sensor for directing a light beam and for tracking the position of a light beam on the tracking position sensor, the tracking position sensor comprising:

a first light detector capable of producing a first electrical signal based upon the amount of light incident on the first light detector;

a reflective surface, sharing a border with the first light detector and capable of reflecting light incident on the reflective surface; and a second light detector sharing a border with the reflective surface and capable of producing a second electrical signal based upon the amount of light incident on the second light detector.

9. The tracking position sensor of claim 8 wherein the first light detector is positioned relative to the second light detector such that when a light beam smaller than the tracking position sensor is incident on the tracking position sensor a change in the position of the light beam that increases the light incident on the first light detector decreases the light incident on the second light detector.

* * * * *

UNITED STATES PATENT AND TRADEMARK OFFICE
CERTIFICATE OF CORRECTION

PATENT NO. : 6,160,774
DATED : December 12, 2000
INVENTOR(S) : Gage et al.

It is certified that error appears in the above-identified patent and that said Letters Patent is hereby corrected as shown below:

```
Column 4, line 33, change "signals" to --signal--.
Column 4, line 33, change "chances" to --changes--.
```

Signed and Sealed this

Twenty-ninth Day of May, 2001

Attest:

NICHOLAS P. GODICI

Attesting Officer

Acting Director of the United States Patent and Trademark Office